United States Patent
Almulhim

(10) Patent No.: US 12,086,252 B2
(45) Date of Patent: Sep. 10, 2024

(54) SYSTEM AND METHOD FOR PRESERVING FORENSIC COMPUTER DATA

(71) Applicant: Saudi Arabian Oil Company, Dhahran (SA)

(72) Inventor: Ammar Abdulateef Almulhim, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 366 days.

(21) Appl. No.: 17/651,646

(22) Filed: Feb. 18, 2022

(65) Prior Publication Data
US 2023/0267209 A1  Aug. 24, 2023

(51) Int. Cl.
*G06F 21/56* (2013.01)
*G06F 11/14* (2006.01)
*G06F 21/78* (2013.01)

(52) U.S. Cl.
CPC ........ *G06F 21/568* (2013.01); *G06F 11/1451* (2013.01); *G06F 21/78* (2013.01)

(58) Field of Classification Search
CPC .... G06F 21/568; G06F 11/1451; G06F 21/78; G06F 11/1435; G06F 11/1469; G06F 21/554; G06F 2221/2143
See application file for complete search history.

(56) References Cited

U.S. PATENT DOCUMENTS

| | | | |
|---|---|---|---|
| 7,640,323 B2 | 12/2009 | Sun | |
| 8,656,095 B2 | 2/2014 | Coulter | |
| 10,067,787 B2 | 9/2018 | Bronner et al. | |
| 10,140,475 B2 | 11/2018 | Sun | |
| 2006/0026432 A1 | 2/2006 | Weirauch et al. | |
| 2009/0164522 A1 | 6/2009 | Fahey | |
| 2009/0323972 A1* | 12/2009 | Kohno | G06F 21/6245 380/284 |
| 2010/0030786 A1* | 2/2010 | McConnell | G06Q 10/06 707/706 |
| 2011/0276770 A1 | 11/2011 | Zhu et al. | |

(Continued)

FOREIGN PATENT DOCUMENTS

| | | |
|---|---|---|
| IN | 201821049924 A | 1/2019 |
| KR | 101968539 B1 | 4/2019 |

OTHER PUBLICATIONS

Evidence Hard Drive retrieved from https://www.sciencedirect.com/topics/computer-science/evidence-hard-drive on Aug. 27, 2021.

*Primary Examiner* — Tauqir Hussain
(74) *Attorney, Agent, or Firm* — Leason Ellis LLP

(57) ABSTRACT

A system and method preserve forensic computer data to remediate data attacks on a computer system. The method includes receiving evidentiary data from a data source, wherein the evidentiary data is related to the processing of information by a computer system, storing the evidentiary data as forensic data in a protected hardware-based forensic data reserve, and detecting a data attack on the computer system. In the event of the data attack having occurred, the method retrieves the stored forensic data from the forensic data reserve, and remediates the data attack including restoring deleted data using the retrieved forensic data, wherein the deleted data were removed from the computer system during the data attack. The system implements the method.

17 Claims, 2 Drawing Sheets

(56) References Cited

U.S. PATENT DOCUMENTS

| | | | |
|---|---|---|---|
| 2012/0102571 A1 | 4/2012 | Sheldon | |
| 2014/0281320 A1* | 9/2014 | Sun | G06F 21/575 |
| | | | 711/163 |
| 2017/0244762 A1* | 8/2017 | Kinder | H04L 63/1425 |
| 2017/0279852 A1* | 9/2017 | Drummond | H04L 63/02 |
| 2017/0337251 A1* | 11/2017 | Kordasiewicz | G06F 16/248 |
| 2018/0032518 A1* | 2/2018 | Kordasiewicz | G06F 16/338 |
| 2018/0336350 A1* | 11/2018 | Lin | G06F 21/51 |
| 2018/0373866 A1* | 12/2018 | Sweeney | G06F 21/577 |
| 2019/0222878 A1* | 7/2019 | Cocchi | H04N 5/913 |
| 2021/0058412 A1* | 2/2021 | Rowland | H04L 9/0825 |
| 2021/0255939 A1* | 8/2021 | Chaiken | G06F 11/0757 |

\* cited by examiner

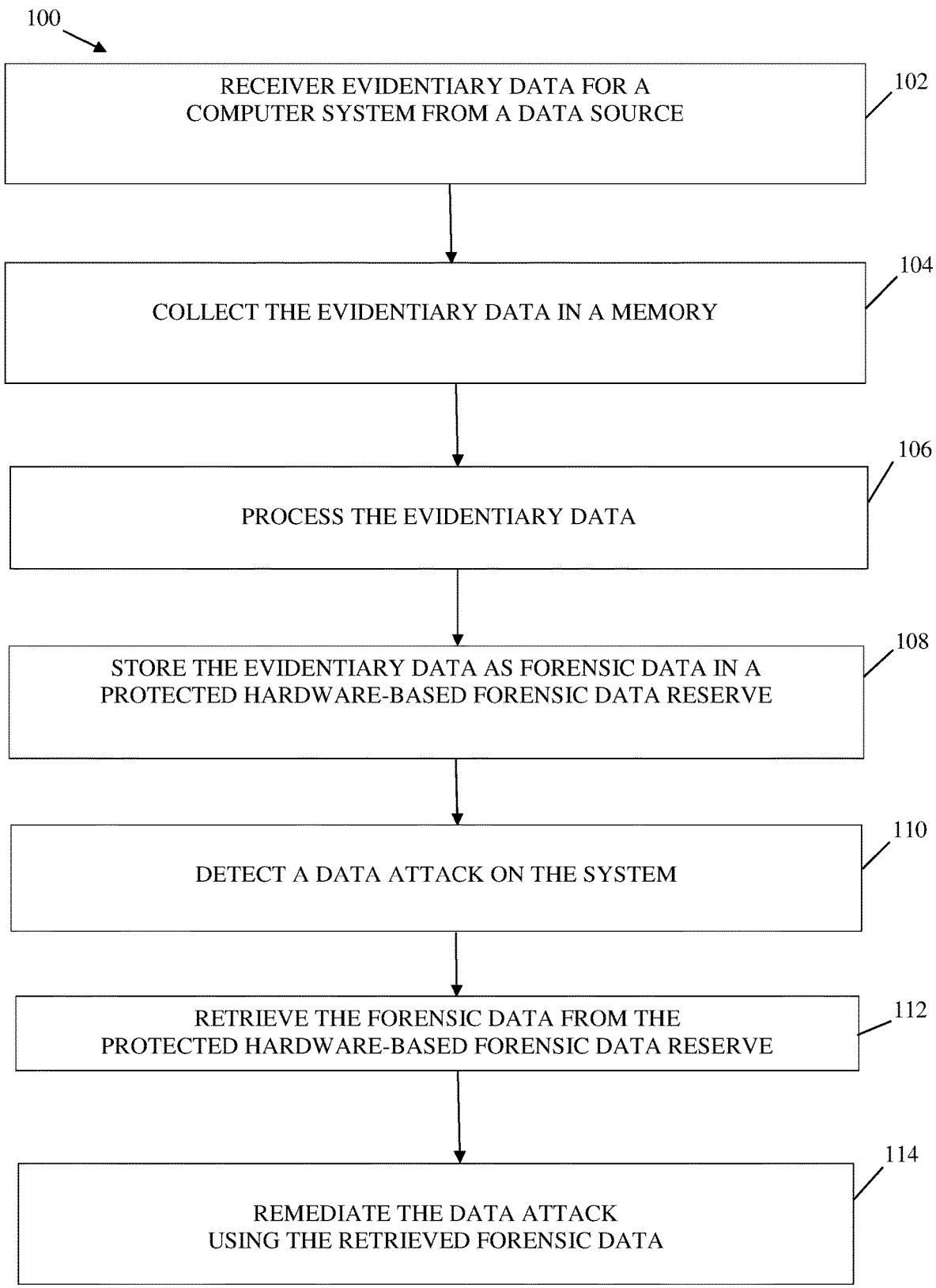

SYSTEM AND METHOD FOR PRESERVING FORENSIC COMPUTER DATA

FIELD OF THE DISCLOSURE

The present disclosure relates generally to using forensic data to remediate data attacks on a computer system, and, more particularly, to a system and method for preserving forensic computer data.

BACKGROUND OF THE DISCLOSURE

Attacks on a computer system by malware, computer viruses, or active hackers can result in significant damage to the computer system. Often, data is modified, stolen, or simply deleted. One method of attack is to cover the tracks of the attacker, in which the attacker deletes whatever traces or artifacts had been left by the actions of the attacker. For example, the attacker can delete computer logs, computer files created during the attack, or computer registry keys. As a result of such deletion activities, valuable forensic data is missing for evaluating or restoring data in a targeted computer system. In such a case, a forensic computer investigation would result in no results.

SUMMARY OF THE DISCLOSURE

According to an embodiment consistent with the present disclosure, a system and method preserve forensic computer data to remediate data attacks on a computer system.

In an embodiment, a method comprises receiving evidentiary data from a data source, wherein the evidentiary data is related to the processing of information by a computer system. The method then stores the evidentiary data as forensic data in a protected hardware-based forensic data reserve, detects a data attack on the computer system, and in the event of the data attack having occurred, retrieves the stored forensic data from the forensic data reserve. The method then remediates the data attack including restoring deleted data using the retrieved forensic data, wherein the deleted data were removed from the computer system during the data attack.

The receiving of the evidentiary data and the storing of the evidentiary data as the forensic data are performed at predetermined time intervals. The data source is selected from the group consisting of: an event log repository, a computer registry, a collection of browser settings, a browser history, a list of executables, a list of opened computer files, and a list of opened computer folders. Alternatively, the data source is an internal data source or an external data source. The protected hardware-based forensic data reserve is a hardware-based memory having an integrated microcontroller. The protected hardware-based forensic data reserve includes hardcoded code therein configured to perform the storing of the evidentiary data as the forensic data in the hardware-based memory. The data reserve can be embedded in an operating system of the computer system. The protected hardware-based forensic data reserve is isolated from other hardware of the computer system.

In another embodiment, a computer system comprises a processor, a memory, a protected hardware-based forensic data reserve, and a remediation module. The processor includes code therein configured to receive evidentiary data from a data source. The memory is configured to collect the evidentiary data. The protected hardware-based forensic data reserve includes code therein configured to store the collected evidentiary data as forensic data. The remediation module includes code therein configured to remediate a data attack on the computer system using the stored forensic data by restoring deleted data from the stored forensic data, wherein the deleted data were removed from the computer system during the data attack.

The processor receives the evidentiary data and stores the collected evidentiary data as the forensic data at predetermined time intervals. The data source is selected from the group consisting of: an event log repository, a computer registry, a collection of browser settings, a browser history, a list of executables, a list of opened computer files, and a list of opened computer folders. Alternatively, the data source is an internal data source or an external data source. The protected hardware-based forensic data reserve includes a hardware-based memory having an integrated microcontroller. The protected hardware-based forensic data reserve includes hardcoded code therein configured to store the forensic data in the hardware-based memory. The protected hardware-based forensic data reserve can be embedded in an operating system of the computer system.

In a further embodiment, a system comprises a network, an external data source communicatively connected to the network, and a computer. The computer is communicatively connected to the network and includes a processor, a memory, a protected hardware-based forensic data reserve, and a remediation module. The processor includes code therein configured to receive evidentiary data from an internal data source or the external data source. The memory is configured to collect the evidentiary data. The protected hardware-based forensic data reserve includes code therein configured to store the collected evidentiary data as forensic data. The remediation module including code therein configured to remediate a data attack on the computer using the stored forensic data by restoring deleted data from the stored forensic data, wherein the deleted data were removed from the computer during the data attack.

The internal data source is selected from the group consisting of: an event log repository, a computer registry, a collection of browser settings, a browser history, a list of executables, a list of opened computer files, and a list of opened computer folders. The protected hardware-based forensic data reserve can be embedded in an operating system of the computer. The protected hardware-based forensic data reserve includes a hardware-based memory having an integrated microcontroller. The protected hardware-based forensic data reserve includes hardcoded code therein configured to store the forensic data in the hardware-based memory.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 2 is a flowchart of a method operating the system of FIG. 1.

Figure 1:
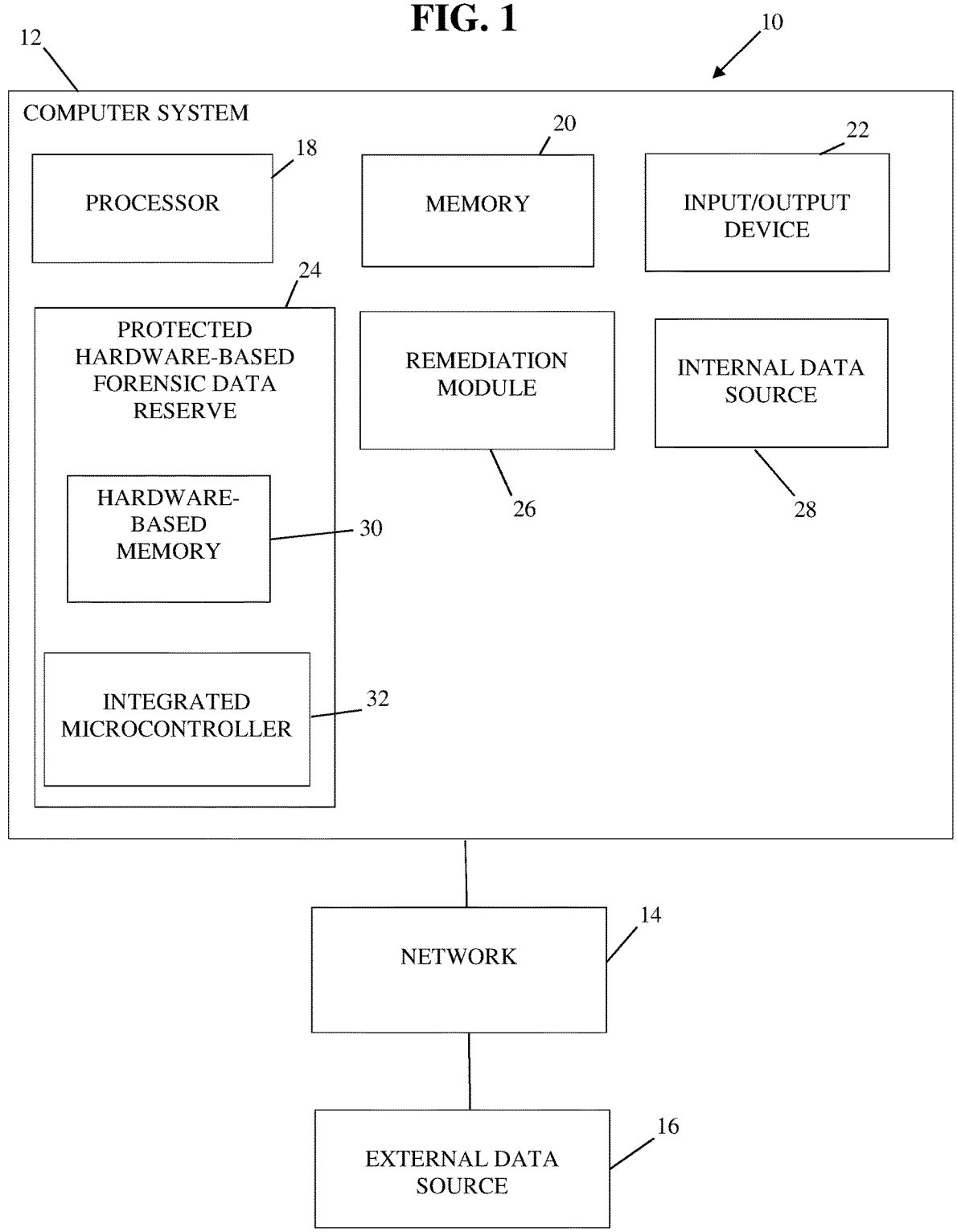
FIG. 1 is a schematic of a system, according to an embodiment.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 10 and method 100 for preserving forensic computer data.

Referring to FIG. 1, the system 10 includes a computer system 12 communicatively connected to a network 14. The network 14 can be a local area network (LAN). Alternatively, the network 14 can be a wide area network (WAN). Still further, the network 14 can be the Internet. In addition, the network 14 can be any known collection of interconnected devices capable of communicating with other devices using a known communication protocol. The network 14 can be communicatively connected to an external data source 16. The external data source 16 can include a database storing data used by the computer system 12. In addition, the external data source 16 can include an event log repository. Also, the external data source 16 can include a computer registry. Alternatively, the external data source 16 can include a collection of browser settings. Still further, the external data source 16 can include a browser history. In addition, the external data source 16 can include a list of executables. The external data source 16 can also include a list of opened computer files. Further, the external data source 16 can include a list of opened computer folders.

The computer system 12 can be a personal computer. Alternatively, the computer system 12 can be a laptop. In addition, the computer system 12 can be a tablet. The computer system 12 can also be a smartphone. Still further, the computer system 12 can be a terminal. The computer system 12 includes a processor 18, a memory 20, an input/output device 22, a protected hardware-based forensic data reserve 24, a remediation module 26, and an internal data source 28. The processor 18 can include any known type of data processing hardware. For example, the processor 18 can include a microprocessor. Alternatively, the processor 18 can include a programmable logic controller (PLC). The memory 20 can include a volatile memory such as random access memory (RAM). Alternatively, the memory 20 can include a non-volatile memory such as read only memory (ROM). The input/output device 22 can include a communication interface, for example, to communicate with the network 14. Alternatively, the input/output device 22 can include a transceiver. The input/output device 22 can communicate with the network 14 using a wired connection. Alternatively, the input/output device 22 can communicate with the network 14 using a wireless connection. The input/output device 22 can also include a keyboard, a mouse, and a display, such as a touch screen.

The protected hardware-based forensic data reserve 24 can include a hardware-based memory 30 and an integrated microcontroller 32. For example, the hardware-based memory 30 can include an erasable programmable read only memory (EPROM). Alternatively, the hardware-based memory 30 can include an electrically erasable programmable read-only memory (EEPROM).

Further, the protected hardware-based forensic data reserve 24 includes hardcoded code therein configured to perform the storing of data in the hardware-based memory 30, as described below. In addition, the protected hardware-based forensic data reserve 24 can be embedded in an operating system of the computer system 12. The protected hardware-based forensic data reserve 24 can be isolated from other hardware of the computer system 12. For example, isolation of the reserve 24 from other hardware-based components 18, 20, 22, 26, 28 of the computer system 12 can be performed using a data buffer. Alternatively, the isolation can be performed using one-way communication channels between the reserve 24 and the other hardware-based components 18, 20, 22, 26, 28.

The remediation module 26 can include hardware having code therein configured to remediate the computer system 12 after a data attack. For example, the remediation module 26 can restore deleted data that were removed from the computer system 12 during the data attack, as described below. The internal data source 28 can include a database storing data used by the computer system 12. In addition, the internal data source 28 can include an event log repository. Also, the internal data source 28 can include a computer registry. Alternatively, the internal data source 28 can include a collection of browser settings. Still further, the internal data source 28 can include a browser history. In addition, the internal data source 28 can include a list of executables. The internal data source 28 can also include a list of opened computer files. Further, the internal data source 28 can include a list of opened computer folders.

Referring to FIG. 2, a method 100 includes receiving evidentiary data from a data source in step 102, with the evidentiary data being related to the processing of information by the computer system 12. As described above, the data source can be an external data source 16. Alternatively, the data source can be an internal data source 28. In addition, the evidentiary data can be received from multiple data sources 16, 28. Step 102 can be performed, for example, at regular time intervals. In one embodiment, the receiving of evidentiary data can occur every hour. Alternatively, the receiving of evidentiary data can occur every second. A system administrator can set the frequency of the receiving of evidentiary data using, for example, the input/output device 22. The receiving in step 102 can be performed using a predetermined software application being executed in the background of operation of the computer system 12. The predetermined software application can read system event logs, application event logs, and security event logs to obtain the evidentiary data. For example, the computer system 12 can operate using the MICROSOFT WINDOWS operating system having a built-in WINDOWS event viewer. The predetermined software application accesses and obtains the evidentiary data using the WINDOWS event viewer. In addition, the predetermined software application can read registry keys of the operating system of the computer system 12 as the evidentiary data received in step 102. Also, the predetermined software application can read evidentiary data from different critical computer directories and data sets. As described above, the evidentiary data can include browser settings, browser history data, a list of executables, a list of opened computer files, and a list of opened computer folders.

The method 100 then collects in the memory 20 the evidentiary data from the at least one data source 16, 28 in step 104. In one embodiment, the evidentiary data can have associated time stamps determined at the time that such evidentiary data are received in step 102. The method 100 processes the evidentiary data in step 106 using the processor 18. For example, the processor 18 can check the format of the evidentiary data. The processor 18 can also reformat the evidentiary data to be in a format to be stored in the protected hardware-based forensic data reserve 24. The method 100 then stores the evidentiary data as forensic data in the protected hardware-based forensic data reserve 24 in step 108. Step 108 can be performed, for example, at regular time intervals. In one embodiment, the storing of evidentiary data as forensic data can occur every hour. Alternatively, the storing of evidentiary data as forensic data can occur every second. A system administrator can set the frequency of the storing of evidentiary data as forensic data using, for example, the input/output device 22. Accordingly, the method 100 ensures the availability of up-to-date forensic data regardless of any data attack on the computer system 12.

The method 100 then detects a data attack on the computer system 12 in step 110. For example, using known malware and anti-virus software, the processor 18 can determine whether there was a data attack. For example, the data attack can result in data being deleted from the computer system 12. Detection of cybersecurity attacks can be by any known detection methodology implemented in place. For example, up-normal behavior of the computer, malicious accounts creation in the computer, etc. can be used to detect a data attack.

In the event of the data attack having occurred, the method 100 retrieves the stored forensic data from the forensic data reserve 24 in step 112. The method 100 then remediates the data attack in step 114. The remediating of the data attack can include restoring deleted data to the computer system 12 using the retrieved forensic data, in the case that the deleted data were removed from the computer system 12 during the data attack. An example is to take advantage of the restored deleted forensics data to restore the computer system 12 to a previous healthy state.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including." "comprises", and/or "comprising." and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-based method, comprising:
    providing a protected hardware-based forensic data reserve comprising:
        a hardware-based memory; and
        hardcoded code therein configured to store forensic data in the hardware-based memory;
    receiving evidentiary data from a data source, wherein the evidentiary data is related to the processing of information by a computer system;
    storing the evidentiary data as the forensic data in the hardware-based memory of the protected hardware-based forensic data reserve using the hardcoded code;
    detecting a data attack on the computer system;
    in the event of the data attack having occurred, retrieving the stored forensic data from the forensic data reserve; and
    remediating the data attack including:
        restoring deleted data using the retrieved forensic data, wherein the deleted data was removed from the computer system during the data attack.

2. The computer-based method of claim 1, wherein receiving the evidentiary data and storing the evidentiary data as the forensic data are performed at predetermined time intervals.

3. The computer-based method of claim 1, wherein the data source is selected from the group consisting of: an event log repository, a computer registry, a collection of browser settings, a browser history, a list of executables, a list of opened computer files, and a list of opened computer folders.

4. The computer-based method of claim 1, wherein the data source is an internal data source or an external data source.

5. The computer-based method of claim 1, wherein the hardware-based memory includes an integrated microcontroller.

6. The computer-based method of claim 1, wherein the data reserve is embedded in an operating system of the computer system.

7. The computer-based method of claim 1, further comprising:
isolating the protected hardware-based forensic data reserve from other hardware of the computer system.

8. A computer system, comprising:
a processor including code therein configured to receive evidentiary data from a data source;
a first memory configured to collect the evidentiary data;
a protected hardware-based forensic data reserve including:
a hardware-based second memory; and
hardcoded code therein configured to store the collected evidentiary data in the hardware-based second memory as forensic data; and
a remediation module including code therein configured to remediate a data attack on the computer system using the stored forensic data by restoring deleted data from the stored forensic data, wherein the deleted data was removed from the computer system during the data attack.

9. The computer system of claim 8, wherein the processor receives the evidentiary data and stores the collected evidentiary data as the forensic data at predetermined time intervals.

10. The computer system of claim 8, wherein the data source is selected from the group consisting of: an event log repository, a computer registry, a collection of browser settings, a browser history, a list of executables, a list of opened computer files, and a list of opened computer folders.

11. The computer system of claim 8, wherein the data source is an internal data source or an external data source.

12. The computer system of claim 8, wherein the hardware-based second memory includes an integrated microcontroller.

13. The computer system of claim 8, wherein the protected hardware-based forensic data reserve is embedded in an operating system of the computer system.

14. A system, comprising:
a network;
an external data source communicatively connected to the network; and
a computer communicatively connected to the network and including:
a processor including code therein configured to receive evidentiary data from an internal data source or the external data source;
a first memory configured to collect the evidentiary data;
a protected hardware-based forensic data reserve including:
a hardware-based second memory; and
hardcoded code therein configured to store the collected evidentiary data as forensic data in the hardware-based second memory; and
a remediation module including code therein configured to remediate a data attack on the computer using the stored forensic data by restoring deleted data from the stored forensic data, wherein the deleted data was removed from the computer during the data attack.

15. The system of claim 14, wherein the internal data source is selected from the group consisting of: an event log repository, a computer registry, a collection of browser settings, a browser history, a list of executables, a list of opened computer files, and a list of opened computer folders.

16. The system of claim 14, wherein the protected hardware-based forensic data reserve is embedded in an operating system of the computer.

17. The system of claim 14, wherein the hardware-based second memory includes an integrated microcontroller.

* * * * *